United States Patent [19]

Gao

[11] Patent Number: 5,507,116
[45] Date of Patent: Apr. 16, 1996

[54] AIR-PRUNING PLANT GROWING SYSTEM

[75] Inventor: Jianhua Gao, Lexington, N.C.

[73] Assignee: New Century Technology, Lexington, N.C.

[21] Appl. No.: 320,311

[22] Filed: Oct. 11, 1994

[51] Int. Cl.[6] ............................................. A01G 23/02
[52] U.S. Cl. ................................. 47/18; 47/73; 47/87
[58] Field of Search ..................... 47/73 R, 87, 78 F, 47/18 R

[56] References Cited

U.S. PATENT DOCUMENTS

| 78,233 | 5/1868 | Poullain . | |
|---|---|---|---|
| 100,300 | 3/1870 | Ludlum . | |
| 1,534,508 | 4/1925 | Earp-Thomas . | |
| 2,758,419 | 8/1956 | Schmitz | 47/37 |
| 3,712,252 | 1/1973 | Huang | 47/87 |
| 3,846,936 | 11/1974 | Kelley | 47/58 |
| 4,130,072 | 12/1978 | Dedolph | 111/2 |
| 4,159,597 | 7/1979 | Olsen | 47/58 |
| 4,236,350 | 12/1980 | Hasselbach | 47/87 |
| 4,291,494 | 9/1981 | Knablein | 47/87 |
| 4,296,569 | 10/1981 | Edwards | 47/73 |
| 5,179,800 | 1/1993 | Huang | 47/73 |

FOREIGN PATENT DOCUMENTS

| 2744143 | 4/1979 | Germany | 47/78 F |
|---|---|---|---|
| 138325 | 8/1982 | Japan | 47/78 F |
| 399175 | 8/1933 | United Kingdom . | |

*Primary Examiner*—Henry E. Raduazo
*Attorney, Agent, or Firm*—Rhodes, Coats & Bennett

[57] ABSTRACT

An air pruning plant growth system comprising an air-pruning tray having a plurality of plant growth cells with upper elliptical openings within an upper plane, lower elliptical openings with diameters larger than the diameters of the upper elliptical openings within a lower plane spaced from and parallel to the upper plane, continuous, upwardly tapering, side walls joining the upper and lower opening, and a continuous, horizontal bottom wall joining the cells; and a support tray having an air permeable floor and upwardly extending tray side walls.

19 Claims, 5 Drawing Sheets

AIR-PRUNING PLANT GROWING SYSTEM

BACKGROUND OF THE INVENTION

The present invention relates to air-pruning trays used to grow seedlings for transplanting, and in particular to air-pruning trays having a plurality of growing cells of an improved shape. The invention also pertains to air-pruning plant growing systems comprising the aforesaid trays in combination with an air permeable support tray.

In order to satisfy the demand for millions of healthy, uniform seedlings used in the production of tobacco, vegetables, forestry and horticultural plants, as well as to facilitate the automated transplanting of such seedlings, it has become the practice within the industry to produce seedlings under greenhouse conditions in plant trays containing a plurality of growing cells. After the seeds germinate and the seedlings have grown to transplanting size, they are removed from the cells, by hand or mechanical means, and planted in the soil or other final growing location.

One technique that has been found to be highly successful in the producing healthy seedlings of uniform size with a well developed root system is call air-pruning. In air-pruning, seedlings are grown in growing medium in cells which are open at the top and bottom. After the seeds germinate, the plant roots grow toward the bottom of the cell. When the roots reach the lower opening of the cell, they are exposed to air, and hindered. Secondary roots then develop, which also grow downward until reaching the air, and the cycle is repeated. As a result, the seedling develops an extensive system of downwardly extending roots, without root spiraling or root binding.

Normally, the air-pruning tray rests on a detachable bottom tray which has a screen or perforated bottom that fits against the bottom of the cells, preventing loss of the medium from the cells, while allowing air to contact the lower surface of the medium. When the seedlings are ready for transplanting, the bottom tray is separated from the air-pruning tray, and the seedling with its attached medium is removed, normally by pushing the plant and medium out of the cell bottom.

An example of a prior art air-pruning tray system is found in U.S. Pat. No. 5,179,800 to Huang. The system disclosed therein comprises a tray with a plurality of aligned and uniformly spaced, truncated pyramid shaped cells having an open top and an open bottom, and a detachable screen or perforated bottom tray. Each cell tapers upward from the open bottom. The open top of each cell edge has a small inward curl to facilitate the passage of plant shoots during transplanting.

The dimensions of an air-pruning trays are limited by the dimensions which are acceptable by automated transplanting machinery, as well as other factors such as ease of handling. As a result, the number of plant cells that can be incorporated into a tray is limited. Desirably, however, the tray will contain as many cells as possible to reduce the number of trays handled. Sufficient, but not excessive, growing medium and space should be available in each cell to allow for the development of an extensive root structure and a healthy seedling. Ideally, the growing medium can be easily packed to a uniform density within the cell, and the seedling and medium can be readily removed from the cell when the seedling is to be transplanted, without having a tendency to prematurely fall from the cell.

SUMMARY OF THE INVENTION

The present invention provides an improved air-pruning tray which includes a plurality of air-pruning growing cells with improved configurations and properties. A system is also provided which comprises the air-pruning tray in combination with a bottom tray which supports the air-pruning tray, and covers the plant cell bottom openings until transplanting.

While tray cells of various shapes including cylinders and inverted truncated pyramids have been used, practitioners in the relevant art have assumed that plant cells within a plant tray should be in the shape of an open-ended, truncated pyramid as shown, for example, in the above Huang et al patent. In accordance with the present invention, however, it has been discovered that cells having the shape of a truncated cone are, in fact, superior in several respects. As used herein, the term "truncated cone" means a shape defined by an elliptical, e.g., circular, oval or egg-shaped, base, and a tapered wall extending upward toward an apex above the center of the base, with the top removed to from a parallel upper surface having the same shape as the base. Preferably, the base is circular.

Individual transplanting cups in the shape of a truncated cone have been known at least as early as 1868. See U.S. Pat. No. 78,233 to Poullain. Also, an individual flower pot in the shape of a truncated cone with a removable bottom is shown as early as 1870 in U.S. Pat. No. 100,300 to Ludlum. The advantages of this shape over the conventional truncated pyramid shape for a plurality of adjacent cells in air-pruning trays, however, has never been recognized until now.

The number of cells in a tray having a given area is determined by the length and width of the cell at its largest dimension, which is the bottom of the cell in the case of truncated pyramid or truncated cone cells. It has been found that a tray with a given number of cells with the truncated cone configuration exhibit several advantages over trays having the same number of cells with the conventional truncated pyramid configuration. These advantages include the following:

A) With cells having the same diameter, the included volume within the truncated cone configuration is substantially less than that of the truncated pyramid configuration. As a result, less growing medium is required, resulting in a lower cost per seedling. At the same time, there is still sufficient space at the bottom of the cell to permit the development of a healthy root system.

B) The surface area of the truncated cone configuration is also substantially less than that of the truncated pyramid configuration. Therefore, less material is required to manufacture the tray, resulting in further cost savings.

C) In preparing the cell for planting, the cell is filled from the bottom with growing medium. The medium is then packed to a desired density, which should be sufficient to prevent the seed blocks, i.e., the growing medium and seed or seedling, from falling out of the cells, but not so dense as to eliminate adequate pores required for proper aeration and water distribution. The growing medium should be of uniform density throughout the cell. It has been found that this uniformity can be better achieved with the truncated cone configuration.

D) Sufficient friction must exist between the growing medium and the cell wall to prevent the seed block from falling from the cell. It has been determined that the friction required to hold the block in the truncated pyramid cell is greater than that required to hold the block in the truncated cone cell. Thus, a lower packing density is possible with the truncated cone configuration, and less force is required to remove the seed block when transplanting.

The air-pruning tray of the present invention is formed from a sheet of plastic material, e.g., by vacuum forming.

The sheet should be of thickness which is sufficient to provide structural integrity to the tray, but should not be thicker than needed, since unnecessary cost will result. Generally, a sheet thickness of from about 0.5 to about 0.8 mm will be sufficient. The sheet may be of various colors, with black being normal. The sheet is shaped to form a tray with a plurality of identical, aligned growing cells in the shape of a truncated cone open at both ends. Alternatively, the tray may be formed of a foamed material, such as styrofoam in the shape of a sheet having spaced parallel upper and lower surfaces, with the cells extending from the upper to the lower surfaces.

The tray will normally be of a dimension suitable for use with mechanical transplanters. Generally, the tray will have a length of from about 500 mm to about 600 mm, and a width of from about 250 mm to about 310 mm. The tray will have a height of from about 18 mm to about 28 mm. Each tray will include from about 128 to about 288 cells, with a continuous horizontal wall or surface joining the cells.

Each cell has a side wall that tapers upwardly and inwardly at an angle of from about 8° to about 15° from vertical. The upper edge of the side wall forms an elliptical upper cell opening and is curved inwardly to form a reinforcing edge which also facilitates plant removal. The lower edge of each cell defines an elliptical lower cell opening, the diameter of which will depend on such considerations as the size of the tray, the number of cells in the tray, and the size of the seedlings being grown. Generally, the surface area of the lower cell opening will be from about 300 $mm^2$ to about 800 $mm^2$. A continuous, horizontal bottom wall, or cell floor is integral with the lower edges of each cell and joins the cells together. The upper cell openings lie within an upper horizontal plane defined by the upper surface of the tray and the lower cell openings lie within a parallel, space, lower horizontal plane defined by the lower surface of the tray.

Side walls are integral at their lower edges with the ends and side edges of the tray floor and extend upwardly therefrom. The side walls incline outwardly at an angle of from about 2° to about 5°, and join at their ends to form a continuous upstanding wall around the cells. The tipper edges of the side walls extend horizontally, outward to form flanges or ledges, which reinforce the plant tray.

A bottom tray is used as an air permeable covering for the bottom openings of the cells. The bottom tray, which can be formed from the same material as the air-pruning tray, comprises a horizontal, perforated bottom floor or screen, containing a plurality of small holes, which may be circular with a diameter of from about 3 mm to about 5 mm. The floor also includes a plurality to longitudinal and transverse, downwardly extending troughs, which serve to provide structural integrity to the tray as well as remove excess water from the bottom of the growing cells. Each trough comprises a pair of spaced., downwardly extending side walls which are joined at their bottom by a horizontal lower wall. The side edges and ends of the tray also extend downwardly to form downwardly extending support walls.

Side walls which have lower edges integral with the downwardly extending support walls and one downwardly extending end wall extend upwardly at an angle of from about 0° to about 3° from vertical. This angle is not critical, but should be slightly smaller than the outward angle of the walls of the air-pruning tray to promote frictional engagement between the inner surface of the support tray walls and the outer surface of the air-pruning tray walls, thus maintaining their contact. The upper edges of the side walls turn downwardly to provide reinforcement. The side walls only extend around three sides of the tray floor, leaving one end open to facilitate joining and separating the air-pruning tray and the bottom tray.

Other advantages of the present structure over prior art structures will become apparent to one skilled in the art upon a reading of the detailed description which follows.

DETAILED DESCRIPTION OF THE INVENTION

Figure 1:
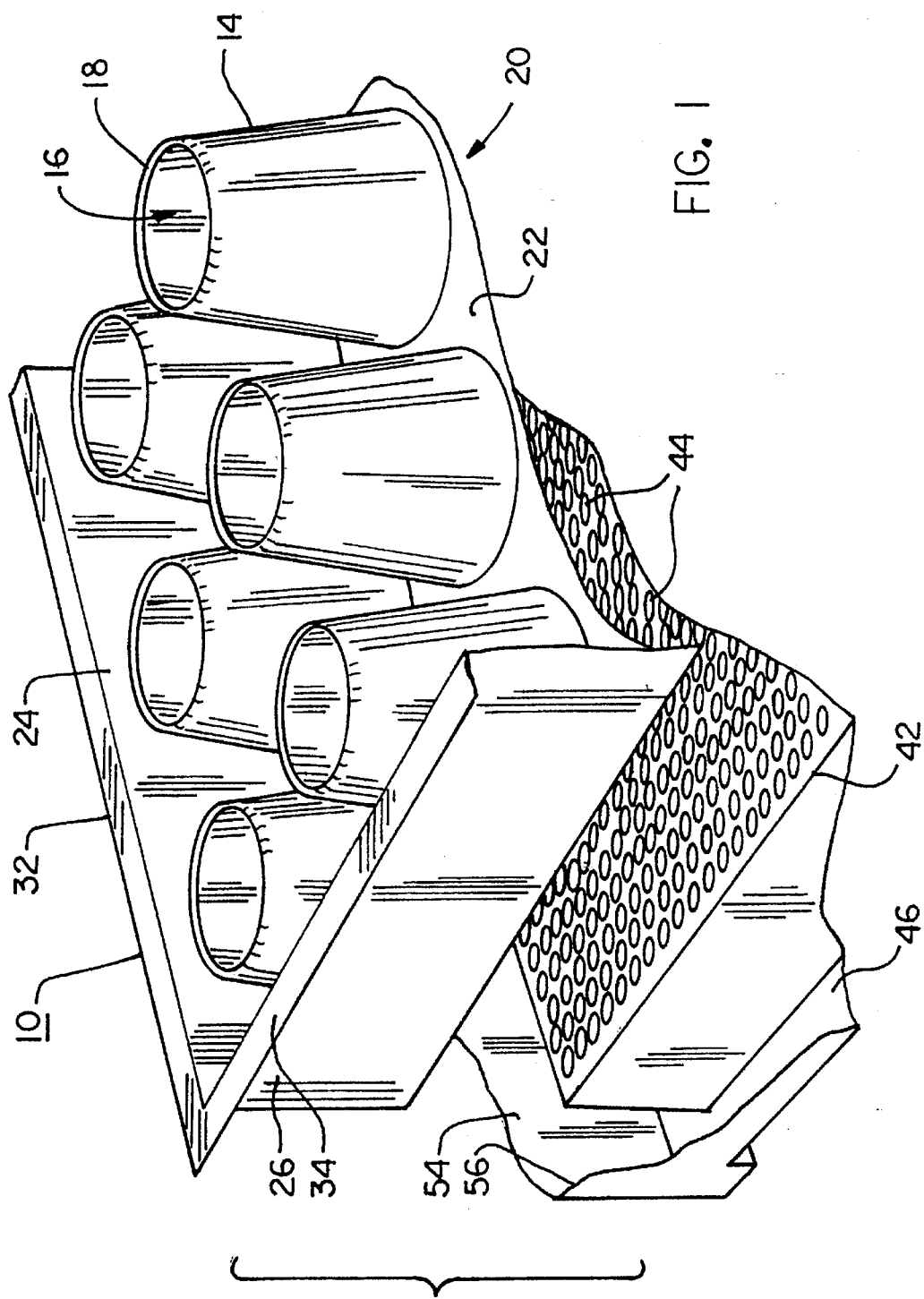
FIG. 1 is an exploded, perspective view of the air-pruning plant growth system comprising the air-pruning tray and the bottom tray, with sections broken away.
Figure 2:
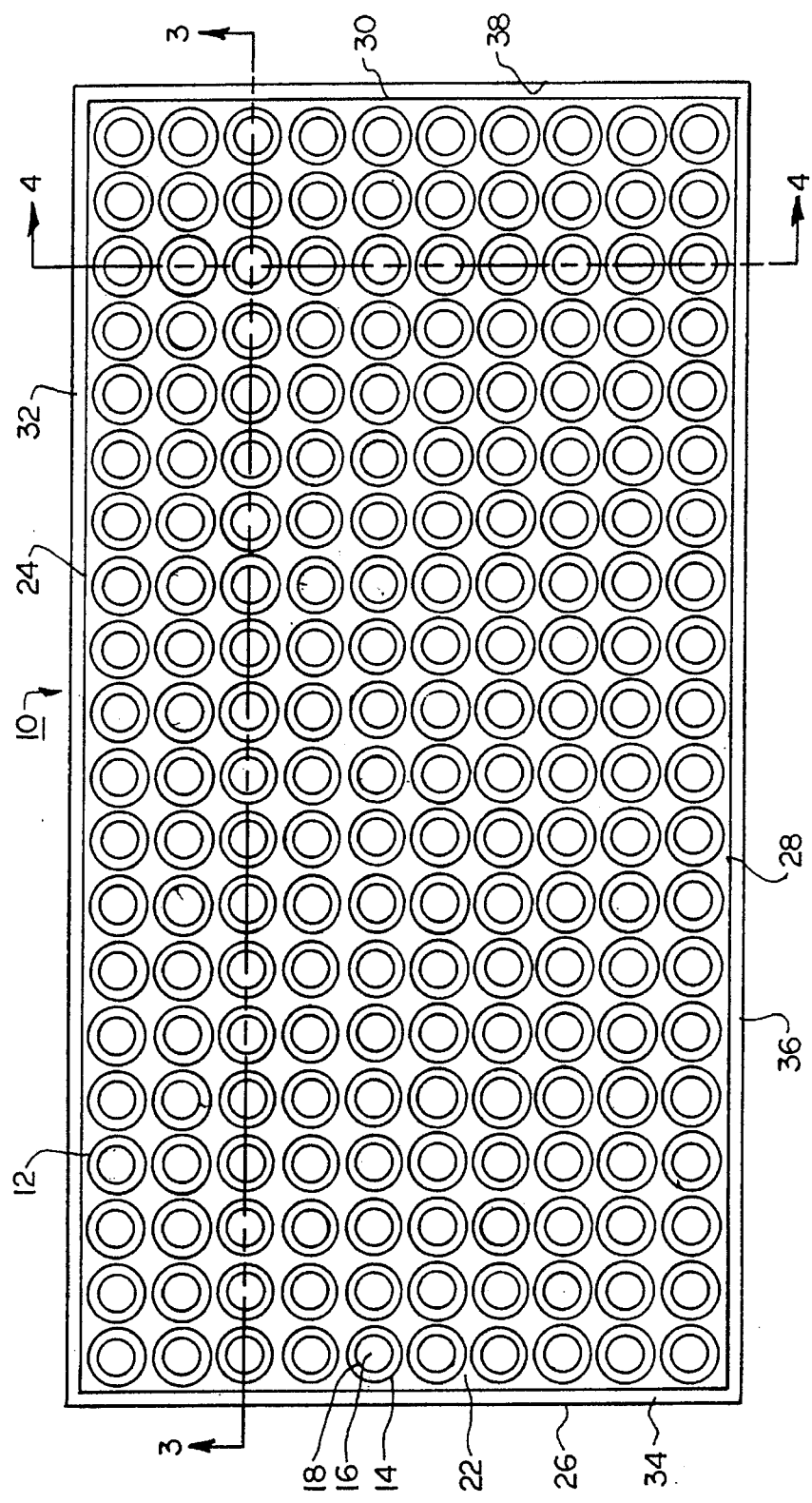
FIG. 2 is a top view of the plant cell tray.
Figure 3:
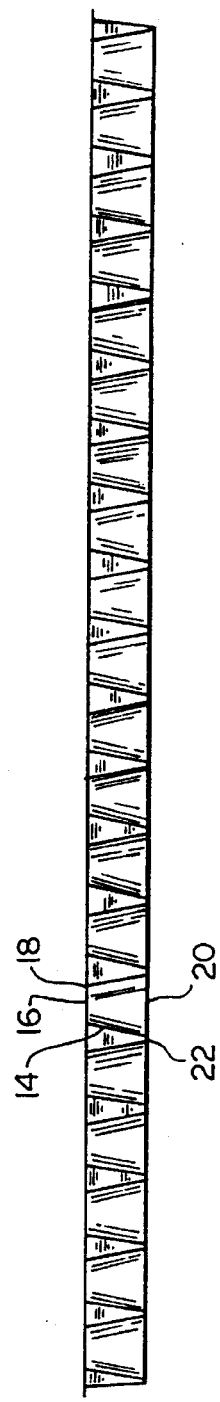
FIG. 3 is a side view of the plant cell tray of FIG. 2, along line 3—3.

In the following description, terms such as horizontal, upright, vertical, above, beneath, and the like, are used solely for the purpose of clarity in illustrating the invention, and should not be taken as words of limitation.

As best seen in FIGS. 1–4, the preferred air-pruning tray, generally 10, which is vacuum formed from a sheet of black polyethylene having a thickness of 0.7 mm, comprises a plurality of growing cells, generally 12, each in the shape of a truncated cone with a continuous tapered side wall, and open at both ends. The tray in the preferred embodiment is 575 mm in length and 296 mm in width, including the extended flange or ledge which will be discussed later, and includes 10 longitudinal rows of 20 cells each. The tray has a height of 25 mm. Since each cell is identical to the other cells, only one cell will be described in detail, it being understood that this description is equally applicable to the other cells.

Each cell 12 comprises a continuous, circular side wall 14, which tapers upwardly and inwardly at an angle of 10° from vertical. The upper edge of wall 14, which defines an upper circular opening 16, terminates in an inwardly curved section 18. The lower edge of wall 14 defines a lower circular opening 20 which has a diameter of 25 mm. The upper openings lie within an upper horizontal plane, and the lower openings lie within a spaced lower horizontal plane parallel to the upper horizontal plane. A horizontal bottom wall or floor 22, also lying within the lower plane joins the lower edges of cell 12 to identical adjacent cells.

Side walls 24, 26, 28 and 30 are integral at their lower edges with the spaced, parallel side edges and spaced, parallel ends of bottom wall 22 and extend upwardly therefrom. Side walls 24, 26, 28 and 30 also are also inclined outwardly at an angle of 3°. Each side wall is integral at its ends with the ends of adjacent side walls, forming a continuous upstanding wall around floor 22. Upper edges of side walls 24, 26, 28 and 30 terminate in horizontal, outwardly extending flanges or ledges 32, 34, 36 and 38, respectively, which help to support the air-pruning tray 10 on the bottom tray.

Figure 5:
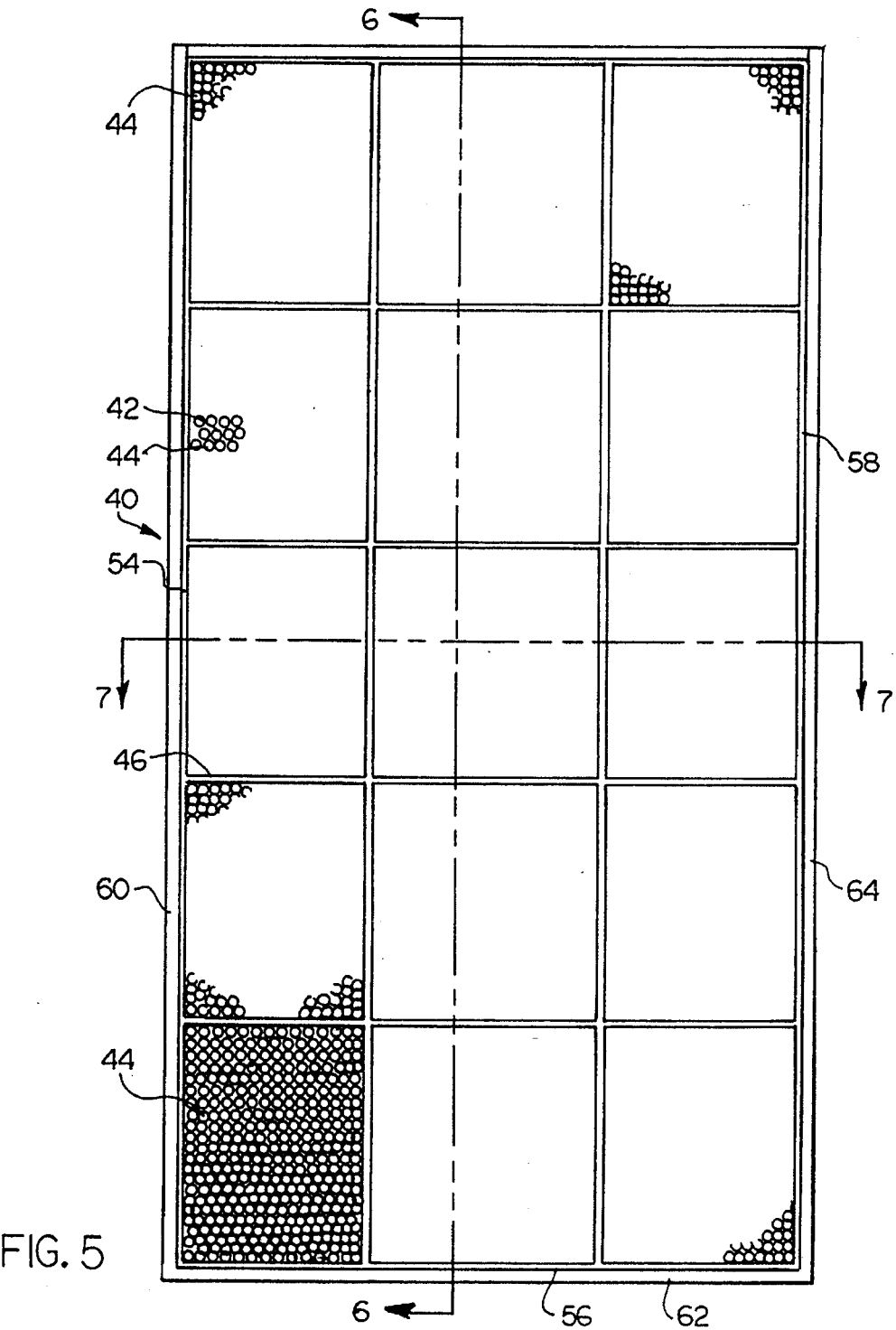
FIG. 5 is a top view of the bottom tray.
Figure 4:
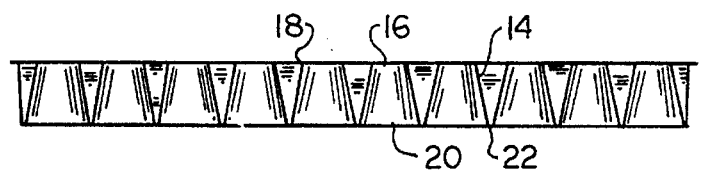
FIG. 4 is a side view of the plant cell tray of FIG. 2, along line 4—4.
Figure 6:
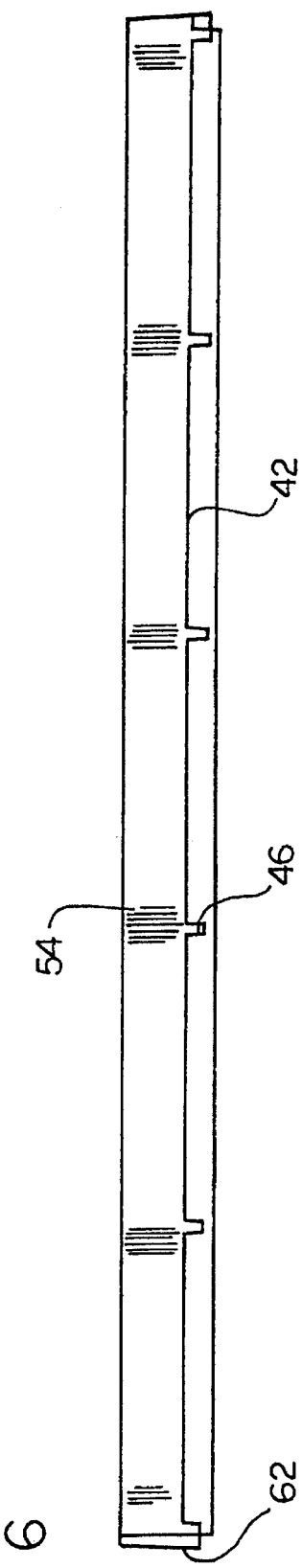
FIG. 6 is a side view of the bottom tray of FIG. 5, along line 6—6.
Figure 7:
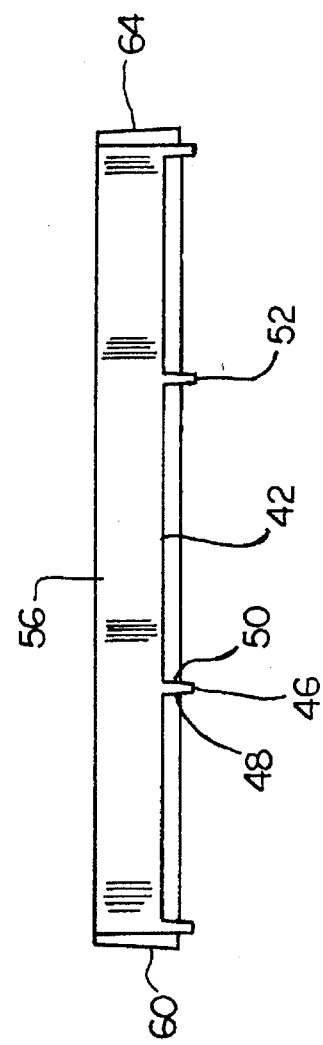
FIG. 7 is a side view of the bottom tray of FIG. 5 along line 7—7.

Bottom tray, generally 40, illustrated in FIGS. 5–7, comprises a rectangular, horizontal, air permeable floor or screen, generally 42, which includes a plurality of openings or holes 44 having a diameter of 4 mm. Holes 44 permit the surface of growing medium in opening 20 of cell 12 to be in contact with the air. Tray 40 further includes a plurality of spaced, parallel, longitudinal and transverse troughs 46, which extend downwardly from floor 42 to a lower spaced plane which is parallel to floor 42. Troughs 46 serve to structurally reinforce tray 40, to support floor 42 above the surface, and to remove excess water from contact with the bottoms of cells 12. Troughs 46 are formed of spaced, downwardly extending side walls 48 and 50 which are joined at their lower edges by lower wall 52.

Side walls 54, 56 and 58 extend upwardly from the outer edges of lower wall 52. Each side wall is integral at its ends with the ends of adjacent side walls, forming a continuous upstanding wall around three sides of floor 42. Walls 54, 56, and 58 also extend outwardly at an angle of 1°. This angle is not critical, but should be slightly smaller than the outward angle of walls 24, 26, 28 and 30. The upper edges of side walls 54, 56 and 58 terminate in downwardly extending flanges 60, 62 and 64, respectively.

To use the air pruning plant growth system, air-pruning tray 10 is inverted and each cell is filled with a suitable growth medium, which is packed into the cell to the desired density. Bottom tray 40 is then inverted and inserted over plant tray 10, so that the air permeable floor covers the lower cell openings, and the inside surfaces of walls 54, 56 and 58 frictionally engage the outside of walls 24, 26 and 28, respectively. The combined trays are then turned upright, and seeds and planted through opening 16 in each cell.

When the plants have reached a size suitable for transplanting, tray 40 is separated from tray 10 and the individual plants and attached growing medium are removed from the cells by pushing downwardly on the plant medium through upper cell opening 16. A preferred planting apparatus is disclosed in U.S. patent application Ser. No. 08/143462, filed Oct. 26, 1993, the entire disclosure of which is incorporated herein by reference.

It will be apparent to one skilled in the art after reading the above specification, that the trays of the present invention present numerous advantages over prior art trays, including the following:

A) With cells having a given diameter, there is sufficient space at the bottom of the cell to permit the development of a healthy root system, while there is substantially less included volume within the present cells, requiring less growing medium and resulting in a lower cost per seedling.

B) The surface area of the present configuration is also substantially less than that of prior configurations, requiring less material is required to manufacture the tray, resulting in further cost savings.

C) Growing medium can be packed to a uniform density throughout the cell which should be sufficient to prevent the seed blocks from falling out of the cells, but not so dense as to eliminate adequate pores required for proper aeration and water distribution.

Figure 8:
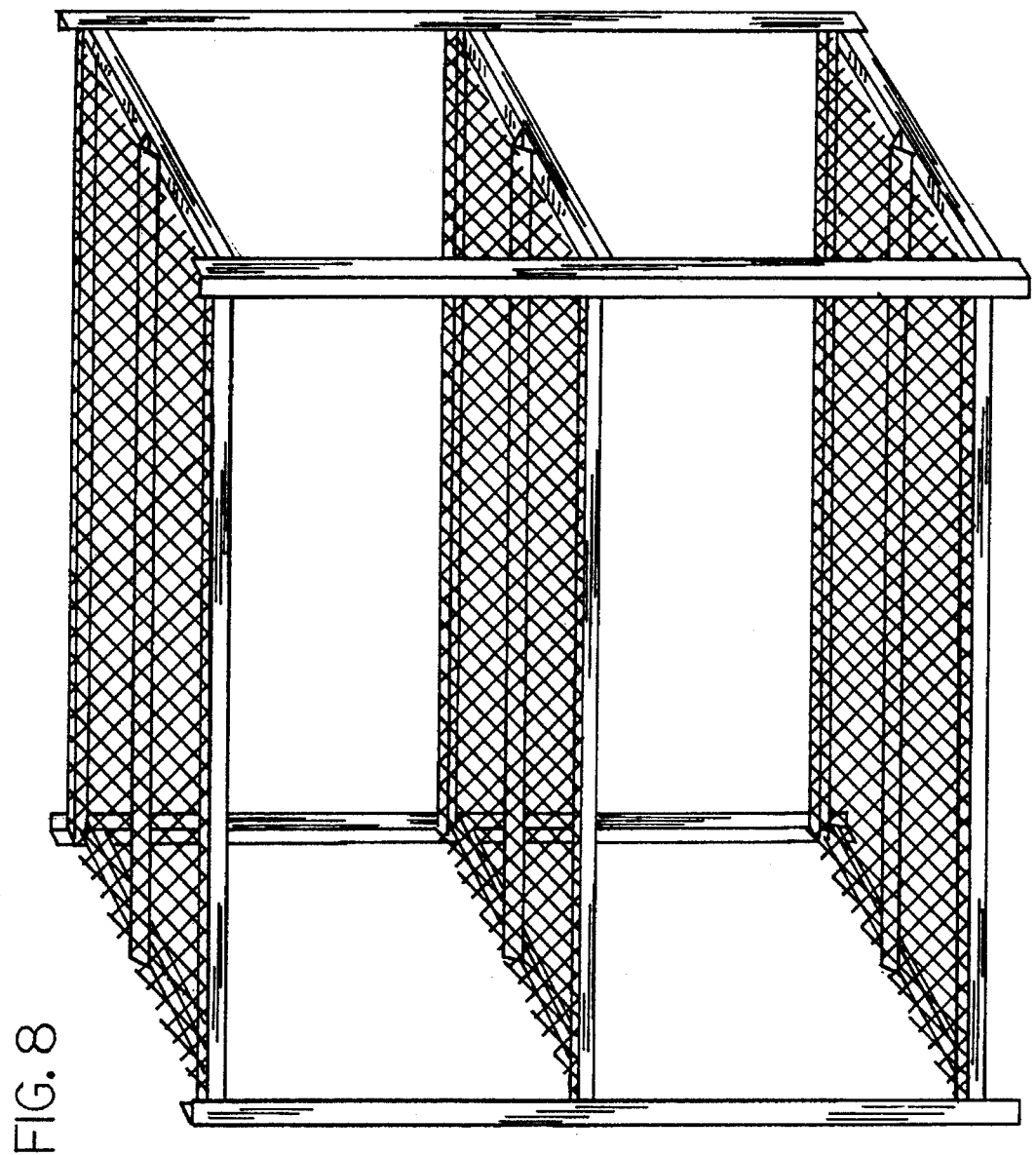
FIG. 8 is a perspective view of a support means for a plant cell tray.

Certain modifications and improvements will occur to those skilled in the art upon a reading of the foregoing description. By way of example, the air-pruning tray can also be used with other bottom trays or support means. One of the support means, for example, is a tray shelf with multiple wire mesh levels on which the planting trays can be supported as shown in FIG. 8. Also, the bottom tray can be formed without supporting ribs, or the ribs can be of a different configuration. It should be understood that all such modifications and improvements have been deleted herein for the sake of conciseness and readability but are properly within the scope of the following claims.

What is claimed is:

1. An air-pruning tray comprising (a) a plurality of growing cells, each of said cells having an upper elliptical opening within an upper plane, a lower elliptical opening having a diameter greater than the diameter of the upper elliptical opening within a lower plane spaced from and parallel to said upper plane, a continuous, upwardly tapering, side wall joining said upper opening and said lower opening, and a continuous, horizontal wall joining said cells;

(b) a support tray having an air-permeable floor adapted to support said horizontal wall, said permeable floor including a plurality of openings or holes, said plurality of holes adapted for bringing air into contact with said lower elliptical openings, said support tray further including a plurality of spaced, parallel, longitudinal, and transverse troughs extending downwardly from said permeable floor to a lower, horizontal plane parallel with said permeable floor, said troughs adapted to structurally reinforce said support tray, said troughs further adapted to support said permeable floor above any horizontal resting surface, whereby airflow is permitted between any resting surface and said permeable floor, said troughs having spaced, downwardly extending side walls integrally joined at their lower edges and adapted to raise said permeable floor above any resting surface.

2. The tray of claim 1, wherein said elliptical openings are circular.

3. The tray of claim 1, wherein said continuous, horizontal wall lies in said lower plane.

4. The tray of claim 3, further comprising side walls extending upwardly from the ends and edges of said continuous horizontal wall to form a continuous wall around said growing cells.

5. The tray of claim 4, wherein said side walls have outwardly extending upper edges.

6. The tray of claim 1, wherein said cells are aligned with one another and uniformly spaced from one another.

7. An air pruning plant tray comprising (a) a horizontal bottom wall having spaced, parallel sides and spaced, parallel ends, said bottom wall having a plurality of lower elliptical openings therein;

(b) upwardly extending side walls having lower edges integral with the sides and ends of said bottom wall; and (c) a plurality of upwardly tapering plant cell walls having lower edges integral with the lower elliptical openings in said bottom wall and upper edges within a plane spaced above, and parallel to, said bottom wall, said upper edges defining upper elliptical openings;

(d) a support tray having an air-permeable floor supporting said horizontal wall, said permeable floor including a plurality of openings or holes, said plurality of holes adapted for bringing air into contact with said lower elliptical openings, said support tray further including a plurality of spaced, parallel, longitudinal, and transverse troughs extending downwardly from said permeable floor to a lower spaced plane in parallel with said permeable floor, said troughs adapted to structurally reinforce said support tray, said troughs further adapted to support said permeable floor above any horizontal resting surface, said troughs having spaced, downwardly extending side walls integrally joined at their lower edges and adapted to raise said permeable floor above any resting surface.

8. The tray of claim 7, wherein said elliptical openings are circular.

9. The tray of claim 7, wherein said plant cell walls taper upwardly at an angle of from about 8° to 15° from vertical.

10. The tray of claim 7, wherein the surface area of each of said lower elliptical openings is from about 300 mm$^2$ to about 800 mm$^2$.

11. The tray of claim 7, wherein said tray has a length of from about 500 mm to about 620 mm, and a width of from about 250 mm to about 310 mm.

12. The tray of claim 7, wherein said lower elliptical openings are aligned in spaced, parallel rows.

13. The tray of claim 7, wherein the vertical distance between said upper elliptical openings and said lower elliptical openings is from about 18 mm to about 28 mm.

14. An air-pruning plant growth system comprising
 (a) an air-pruning tray having a plurality of plant growth cells, each of said cells having an upper elliptical opening within an upper plane, a lower elliptical opening within a lower plane spaced from and parallel to said upper plane, a continuous, upwardly tapering, side wall joining said upper and lower openings;
 (b) a continuous horizontal wall joining said cells; and
 (c) a support tray having an air-permeable floor supporting said horizontal wall, said permeable floor including a plurality of openings or holes, said plurality of holes adapted for bringing air into contact with said lower elliptical openings, said support tray further including a plurality of spaced, parallel, longitudinal, and transverse troughs extending downwardly from said permeable floor to a lower spaced plane in parallel with said permeable floor, said troughs adapted to structurally reinforce said support tray, said troughs further adapted to support said permeable floor above any horizontal resting surface, said troughs having spaced, downwardly extending side walls integrally joined at their lower edges and adapted to raise said permeable floor above any resting surface.

15. The system of claim 14, wherein said elliptical openings are circular.

16. The system of claim 14, wherein said support tray further includes upwardly extending side walls.

17. The system of claim 14, wherein said floor includes a plurality of downwardly extending troughs extending downwardly to a lower plane.

18. The system of claim 16, wherein said tray side walls extend upwardly from said lower plane.

19. The system of claim 14, wherein said floor has circular perforations with a diameter of from about 3 mm to about 5 mm.

* * * * *